Dec. 2, 1930.    A. L. RIKER, JR    1,783,199
SHACKLE CONNECTION BETWEEN SPRING AND FRAME
Filed July 13, 1927    2 Sheets-Sheet 1
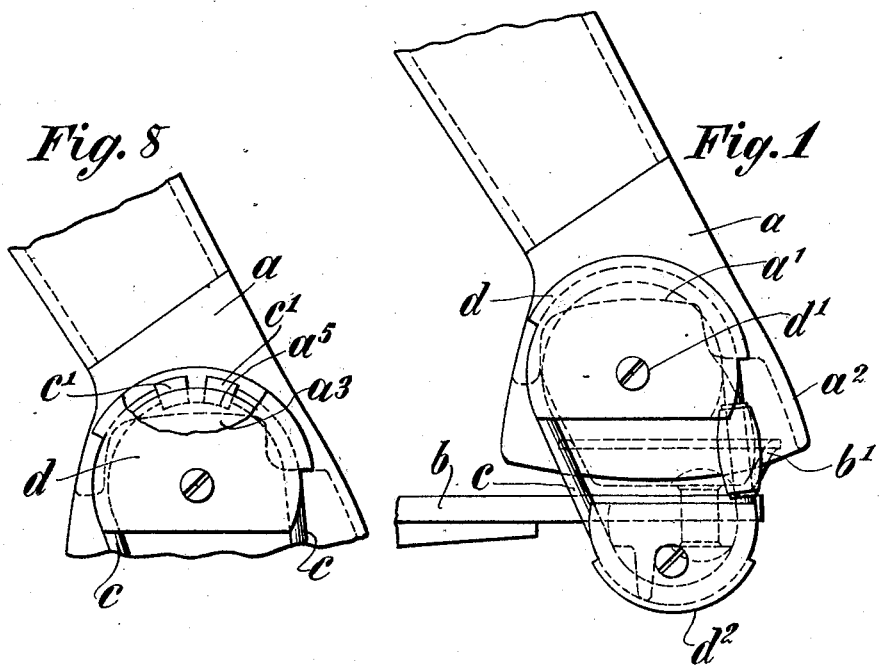
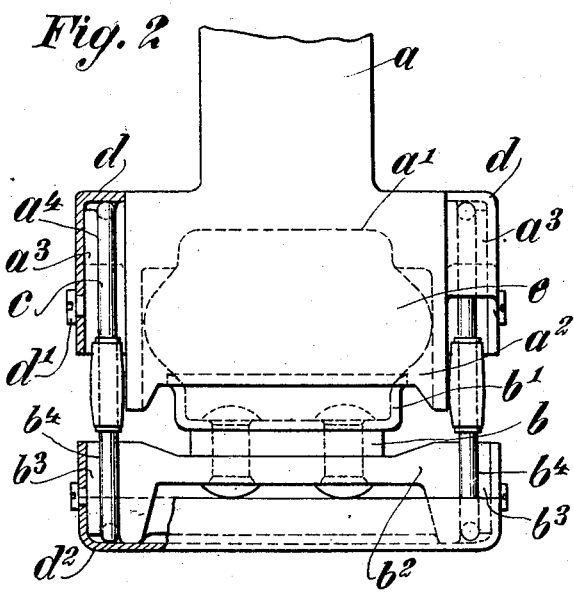
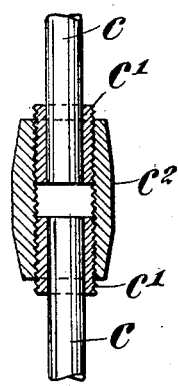
Inventor
Andrew L. Riker jr.,
By his Attorneys
Redding, Greeley, O'Shea & Campbell Dec. 2, 1930. A. L. RIKER, JR 1,783,199
SHACKLE CONNECTION BETWEEN SPRING AND FRAME
Filed July 13, 1927 2 Sheets-Sheet 2
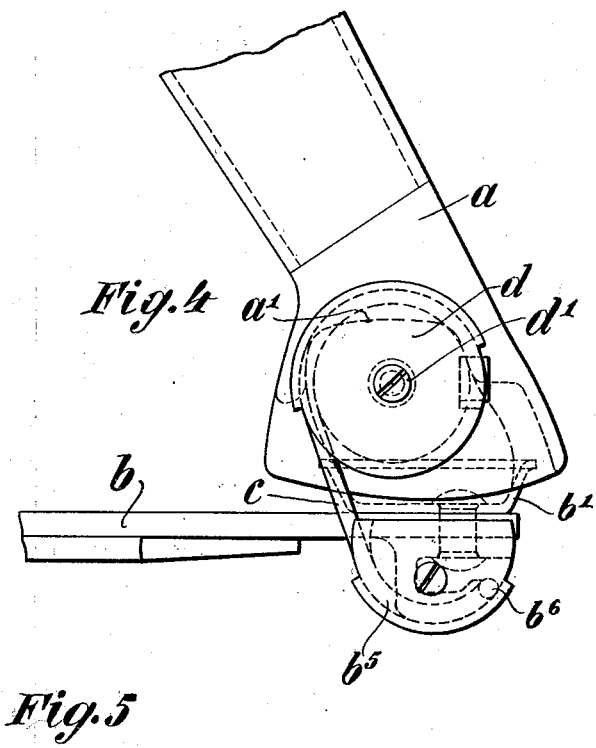
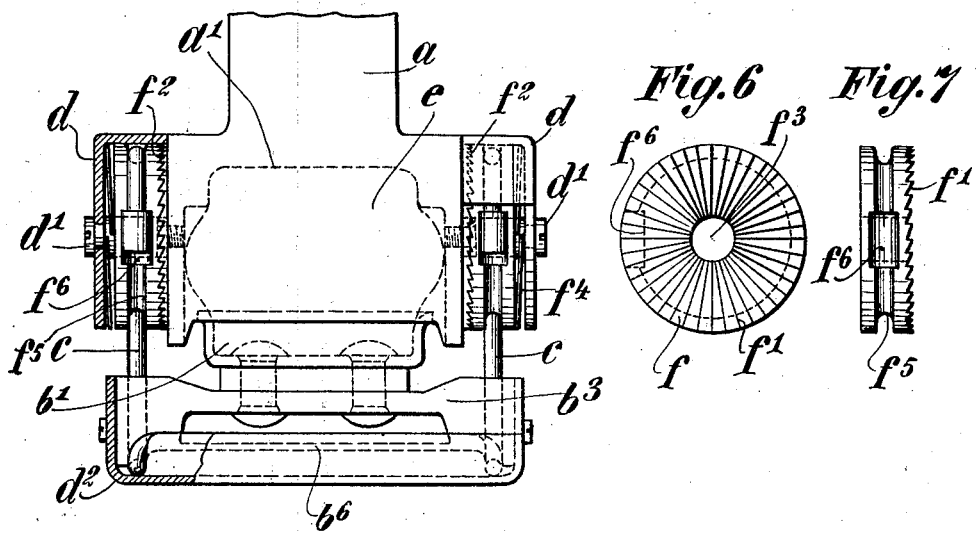
Inventor:
Andrew L. Riker jr.,
By his Attorneys
Redding, Greeley, O'Shea & Campbell Patented Dec. 2, 1930

1,783,199

UNITED STATES PATENT OFFICE

ANDREW LAWRENCE RIKER, JR., OF FAIRFIELD, CONNECTICUT, ASSIGNOR TO THE RUBBER SHOCK INSULATOR CORPORATION, OF WILMINGTON, DELAWARE, A CORPORATION OF DELAWARE

SHACKLE CONNECTION BETWEEN SPRING AND FRAME

Application filed July 13, 1927. Serial No. 205,282.

The present invention relates to connections between relatively movable members wherein a certain degree of movement is to be accommodated without impairing the connection or causing any deleterious effects thereon.

More particularly, the invention relates to connections between the spring and frame of a motor vehicle wherein the floating character of a wholly non-metallic connection is preserved, although certain portions of the structure are metallic. It is common practice to imbed the end of a spring, or other means to be supported, in a quantity of rubber or other suitable non-metallic material, and thus produce a shackle which is extremely durable and effective in cushioning the shocks of ordinary usage. A preferred construction has included a quantity of rubber in which one of the elements is completely embedded, the rubber being contained in a suitable housing and maintained under compression.

An object of the present invention is to provide a connection of the above type, wherein the quantity of the non-metallic yielding material is greatly reduced. A further object of the invention is to produce a shackle construction wherein the size of the connection is reduced and instead of cushioning the rebound of the spring through a column of rubber, this force is taken through a metal path.

A preferred construction of the metal parts is such that the rebound is taken through a length, or lengths of cable which are connected so that no portions receive stresses which cause a weakening of the metal. The design further contemplates the mounting of the cable in a manner to cause a winding action of the cable on a drum of suitable diameter when longitudinal movement takes place between the spring and frame. In this connection it will be noted that the cable is mounted to place the rubber under an initial compression which is determined by the length of the cable.

Further and other objects of the invention will be apparent as the description proceeds, for example, the provision of a means for dismounting the connection quickly and with facility, and reference will now be had to the accompanying drawings forming a part hereof, for a more detailed description of the invention, wherein:

Figure 1 is a side elevation of one form of the invention.

Figure 2 is a front elevation, partly in section, of the device shown in Figure 1.

Figure 3 is a detailed view showing a form of connecting means for the cables of Figures 1 and 2.

Figure 4 is a side elevation of a modified form of the invention.

Figure 5 is a front elevation, partly in section, of the device shown in Figure 4.

Figure 6 is a side elevation of a supporting segment as shown in Figure 5.

Figure 7 is an end elevation of Figure 6.

Figure 8 is a segmental side elevation, partly broken away, of a modified manner of securing the cables in the device of Figures 1 and 2.

Referring particularly to Figures 1, 2 and 3, $a$ indicates the horn on the end of a frame of a vehicle, to which a spring $b$ is to be connected. The horn is provided with a seat $a'$ to receive a block of yielding non-metallic material, such as rubber, and through this material, the weight of the vehicle is carried on the spring. A protective flange $a^2$, serving partially as a housing, is formed on the horn $a$ and oppositely extending cylindrical stubs $a^3$ are formed on the sides of the horn. These stubs have circumferential grooves $a^4$ formed therein and serve as a drum over which a connecting cable $c$ is wound.

To prevent the cable from slipping out of the grooves, suitable caps $d$ are secured to the stubs by screws $d'$, or other suitable means.

The spring $b$ has a seat $b'$ secured to its upper end portion, and a cross piece $b^2$ to its lower side, the seat receiving the lower portion of the block $e$ of non-metallic yielding material and carrying the weight of the vehicle, as well as receiving the stresses impressed upon the block. The cross piece $b^2$ is provided with segmental cylindrical stubs $b^3$ at either side to co-operate with the stubs $a^3$ on the horn. Circumferential grooves $b^4$ are formed in these stubs to receive a cable $c$ and thus permit a cable of continuous form to be passed over each circumferential section on the cross piece $b^2$ and horn $a$. A cap $d^2$ may be provided to serve the same function as the cap $d$.

It will be apparent, from the foregoing description, that the block of rubber $e$ carries the weight of the vehicle, and receives the stresses due to irregularities in the road surface. The cables $c$ are slipped over the circumferential stubs $a^3$ and $b^3$ and maintain the block of rubber under a constant and predetermined degree of compression. During rebound, these cables also prevent the connection from separating and take the stresses due to rebound.

The cylindrical, or drum-shaped portions of the two members, are designed to permit the cable $c$ to wind upon their surfaces during longitudinal movements of spring $b$ instead of slipping thereover, thus preventing injury to the cable. The difference in diameter of the two drum segments about which the cable is wrapped is sufficient to permit a rolling, or a wrapping and unwrapping action to a great degree, thus giving shackling action in a longitudinal direction with the least amount of slippage of the cable. Since slippage is an undesirable feature, and highly injurious to the cable, this construction is particularly advantageous. The abutting ends of the cable $c$ may be secured together by threaded collars $c'$ mounted thereon and nuts $c^2$ screwed over the collars $c'$ as shown in Figure 3. It will be apparent that the degree of compression set up in the rubber by the cable may be determined by the length of cable used and a suitable system may be employed to facilitate the determination of this item.

Figure 8 shows a modified way of securing the cable $c$. In this case, the segmental drums $a^3$ are provided with notches or depressions $a^5$. The collars $c'$ on the cable $c$ may, or may not, be threaded and are fitted into these notches. The shoulders of the notches receive the stresses carried by the cable $c$ and prevent the cable from slipping off of the segmental drums $a^3$. The usual cap $d$ is employed to keep the cable in its groove and prevent the collars $c'$ from slipping out of the notches $a^5$.

Referring to Figures 4, 5, 6 and 7, a modified form of the invention is shown, wherein the cable is formed in a single piece and adapted to be wound between the members $a$ and $b$ upon either side of the rubber block. The elements of the device shown in Figures 1, 2 and 3 are present in this form of the invention and modified in the following manner. The segmental winding drums or stubs, instead of being formed as a part of the horn $a$ are formed separately and indicated at $f$. The inner faces thereof are provided with teeth $f'$ and are adapted to engage co-operating teeth $f^2$ formed on the horn $a$. These teeth are constructed to prevent movement of the winding drums in a direction which would permit separation of the spring and horn during rebound, but permit ratcheting in the opposite direction. The screw $d'$ passes through the axially hollow portion $f^3$ and secures the cap $d$, together with the element $f$, to the horn $a$. If desired, springs $f^4$ may be employed to seat the winding drum $f$ securely against the teeth $f^2$. The cross piece $b^3$ is formed with a continuous groove extending parallel to the groove in the drum $f$ for a portion of its length at either side of the cross piece, and transversely with respect to the above portions for the remainder of its length. The first portions are designated by the reference character $b^5$ and the latter portion by the reference character $b^6$. The cable is anchored at its ends, in notches $f^6$ in the winding drums $f$ and passes over the grooves $f^5$ therein. From the upper, or horn member $a$, the cable passes to the lower cross member $b^2$ and lies in the grooves $b^5$, $b^6$.

In the above form of the invention, the winding drums $f$ may be secured after the cable has been laid in its grooves, and may be ratcheted to place the rubber under a predetermined degree of compression by means of a spanner wrench or other suitable device. The protective caps and associated elements are provided, in each form of the invention.

It will be apparent that the invention may be embodied in various constructions and arrangements of elements, although it has been described with reference to the forms shown in the accompanying drawings. The scope thereof, however, is not to be limited, save as defined in the appended claims.

What I claim is:

1. A connection of the character described comprising a block of yielding non-metallic material disposed between two members to be connected, means to position the block to carry the weight of one member upon another, non-yielding, flexible tensioning means, and means to wind the tensioning means between the elements to prevent them from separating and maintain the non-metallic means always under a predetermined minimum compression.

2. A connection of the character described comprising a block of yielding non-metallic material disposed between two members to be connected, means to position the block to carry the weight of one member upon another, a tensioning means wound between the elements to prevent them from separating, and means to mount the tensioning means to produce a wrapping action therein.

3. A connection of the character described comprising a block of yielding non-metallic material disposed between two members to be connected, means to position the block to carry the weight of one member upon another, tensioning means wound between the elements to prevent them from separating, and cylindrical segments carried by the two members over which the tensioning means is passed whereby a wrapping action takes place therein.

4. A connection of the character described comprising a block of yielding non-metallic material disposed between two members to be connected, means to position the block to carry the weight of one member upon another, a tensioning means wound between the elements to prevent them from separating, cylindrical segments carried by the two members over which the tensioning means is passed whereby a wrapping action takes place therein upon longitudinal movement of one member, and interengaging means between one of the segments and the tensioning means to prevent slippage of the latter.

5. A connection of the character described comprising a block of yielding non-metallic material disposed between two members to be connected, means to position the block to carry the weight of one member upon another, a cable wound between the elements to prevent them from separating, cylindrical segments carried by the two members over which the tensioning means is passed whereby a wrapping action takes place therein upon longitudinal movement of one member, and grooves in the segments to receive the cable.

6. A connection of the character described comprising a block of yielding non-metallic material disposed between two members to be connected, means to position the block to carry the weight of one member upon another, a tensioning means wound between the elements to prevent them from separating, means to mount the tensioning means to produce a wrapping action therein, and means to prevent the tensioning means from slipping off.

7. A connection of the character described comprising a block of yielding non-metallic material disposed between two members to be connected, means to position the block to carry the weight of one member upon another, tensioning means wound between the elements to prevent them from separating, means to mount the tensioning means to produce a wrapping action therein, and caps mounted over the mounting means to prevent the tensioning means from slipping off.

8. A connection of the character described comprising a block of yielding non-metallic material disposed between two members to be connected, means to position the block to carry the weight of one member upon another, a cable wound between the elements to prevent them from separating, cylindrical segments carried by the two members over which the tensioning means is passed whereby a wrapping action takes place therein upon longitudinal movement of one member, grooves in the segments to receive the cable, and caps over the segments to prevent the cable from slipping off.

9. A connection of the character described comprising a block of yielding non-metallic material disposed between two members to be connected, means to position the block to carry the weight of one member upon another, and a tensioning means wound between the elements continuously for a plurality of weight supporting lengths thereof to prevent them from separating.

10. A connection of the character described comprising a block of yielding non-metallic material disposed between two members to be connected, means to position the block to carry the weight of one member upon another, tensioning means wound between the elements continuously for a plurality of weight supporting lengths thereof to prevent them from separating and means to mount the tensioning means to produce a wrapping action therein.

11. A connection of the character described comprising a block of yielding non-metallic material disposed between two members to be connected, means to position the block to carry the weight of one member upon another, a cable anchored at one end to one of the members, and means for winding the cable between the members to place the block under compression.

12. A connection of the character described comprising a block of yielding non-metallic material disposed between two members to be connected, means to position the block to carry the weight of one member upon another, a cable anchored at its ends to one of the members and means for winding the cable between the members on opposite sides of the block to place the latter under compression.

13. A connection of the character described comprising a block of yielding non-metallic material disposed between two members to be connected, means to position the block to carry the weight of one member upon another, a cable anchored at its ends to one of the members, means for winding the cable between the members on opposite sides of the block to place the latter under compression, and caps on each member over the cable to prevent the latter from becoming dislodged.

14. A connection of the character described comprising a block of yielding non-metallic material disposed between two members to be connected, means to position the block to carry the weight of one member upon another, cylindrical segments carried on opposed sides of each member, a cable anchored at its ends to the segments of one member, and means for winding the cable between the members on opposite sides of the block to place the latter under compression.

15. A connection of the character described comprising a block of yielding non-metallic material disposed between two members to be connected, means to position the block to carry the weight of one member upon another, removable cylindrical segments carried on opposed sides of one of the members, a cable anchored at its ends to the segments of one member and means for winding the cable between the members on opposite sides of the block to place the latter under compression.

16. A connection of the character described comprising a block of yielding non-metallic material disposed between two members to be connected, means to position the block to carry the weight of one member upon another, removable cylindrical segments carried on opposed sides of one of the members, a cable anchored at its ends to the segments of one member, means for winding the cable between the members on opposite sides of the block to place the latter under compression, and interengaging portions on the removable segments and supporting member to prevent relative movement therebetween.

This specification signed this 11th day of July, A. D. 1927.

ANDREW LAWRENCE RIKER, Jr.